United States Patent [19]
Castellucci et al.

[11] Patent Number: 5,695,154
[45] Date of Patent: Dec. 9, 1997

[54] GAP FILLER DEVICE

[75] Inventors: Nicholas T. Castellucci, Lomita; Thomas J. Ambrose, Los Angeles, both of Calif.

[73] Assignee: Northrop Grumman Corporation, Los Angeles, Calif.

[21] Appl. No.: 517,518

[22] Filed: Aug. 21, 1995

[51] Int. Cl.$^6$ ............................ B64C 23/00; B64C 7/00
[52] U.S. Cl. ........................... 244/130; 244/131; 244/133
[58] Field of Search ............................ 244/119, 130, 244/131, 132, 133; 296/93, 213; 52/461, 464, 465, 470, 471

[56] References Cited

U.S. PATENT DOCUMENTS

| | | | |
|---|---|---|---|
| 1,331,150 | 2/1920 | Hooper | 244/132 |
| 1,549,721 | 8/1925 | Kraft | 244/131 X |
| 1,800,609 | 4/1931 | Drake | |
| 2,114,289 | 4/1938 | Draim | |
| 2,375,951 | 5/1945 | Simon | 244/132 |
| 2,385,461 | 9/1945 | Pancoe | 244/132 |
| 2,660,275 | 11/1953 | Beck | 296/93 X |
| 3,366,352 | 1/1968 | Edwards et al. | 244/130 |
| 3,508,369 | 4/1970 | Tennison | 52/461 |
| 3,548,557 | 12/1970 | Downing, Jr. | 52/461 |
| 3,593,475 | 7/1971 | LaGue | 52/461 X |
| 3,624,867 | 12/1971 | Reynolds | |
| 3,868,802 | 3/1975 | Schubach | 52/471 X |
| 3,939,752 | 2/1976 | Kosik | |
| 4,481,747 | 11/1984 | Tengesdal et al. | 52/461 X |
| 4,769,966 | 9/1988 | Petri | |
| 5,013,083 | 5/1991 | Yada et al. | 296/213 |
| 5,014,934 | 5/1991 | McClaflin | 244/132 |
| 5,065,960 | 11/1991 | Castellucci | 244/131 |
| 5,265,393 | 11/1993 | Bischel et al. | 52/464 X |

Primary Examiner—William Grant
Attorney, Agent, or Firm—Terry J. Anderson; Karl J. Hoch, Jr.

[57] ABSTRACT

A gap filler device applicable to a gap formed between side walls of adjacent panels comprises an elongated horizontal portion extending across the gap and a vertical portion extending into the gap. The vertical portion includes a pair of opposed, spaced apart, planar bearing surface members biased into frictional engagement with the side walls of the gap to resist removal of the gap filler device. The vertical portion has descending legs extending from opposed sides of the horizontal portion to a bight. Ascending legs extend from the bight to terminal ends. Slots are formed in the vertical portion and extend upwardly from the bight at spaced locations along the length of the legs. In one embodiment, a plurality of outwardly projecting spike members are formed on the bearing surface members for engagement with the side walls of the gap. In another embodiment, the adjacent panels define a gap with opposed overhangs and the terminal ends of the ascending legs are engageable with the overhangs when the vertical portion is inserted into the gap thereby preventing removal of the gap filler device from the gap. In another embodiment, the head member is of ceramic material and has a longitudinally extending slot therein and an elongated retainer member is engageably receivable in the longitudinal slot and the retainer member is fixed to the horizontal portion to thereby prevent its removal. In another embodiment relating to aircraft usage, the head member has opposed longitudinally extending edges contoured to minimize detection by radar.

21 Claims, 4 Drawing Sheets

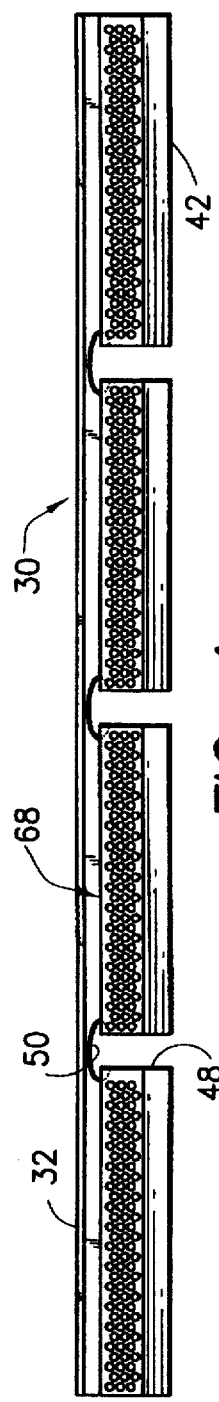
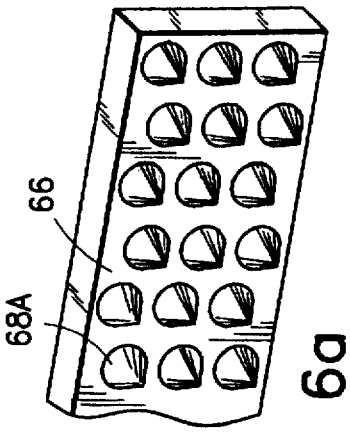
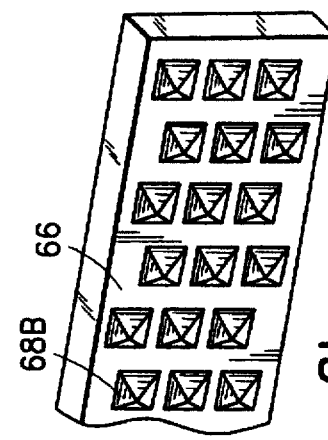
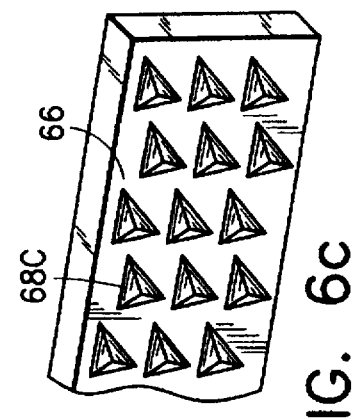
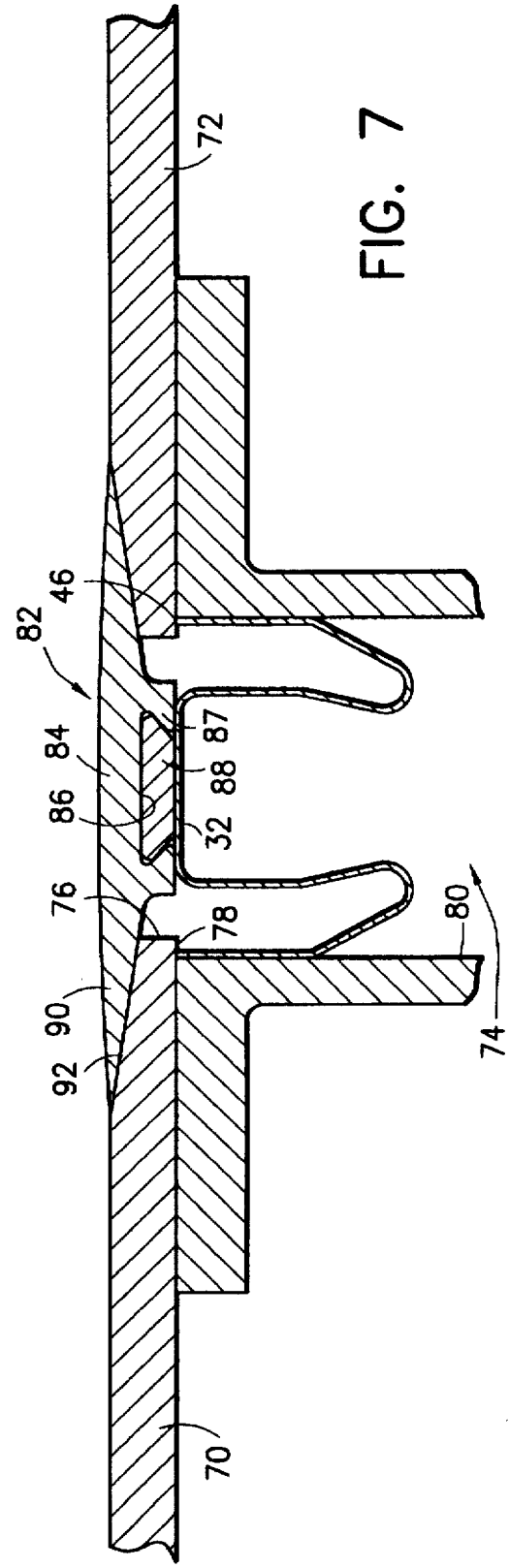

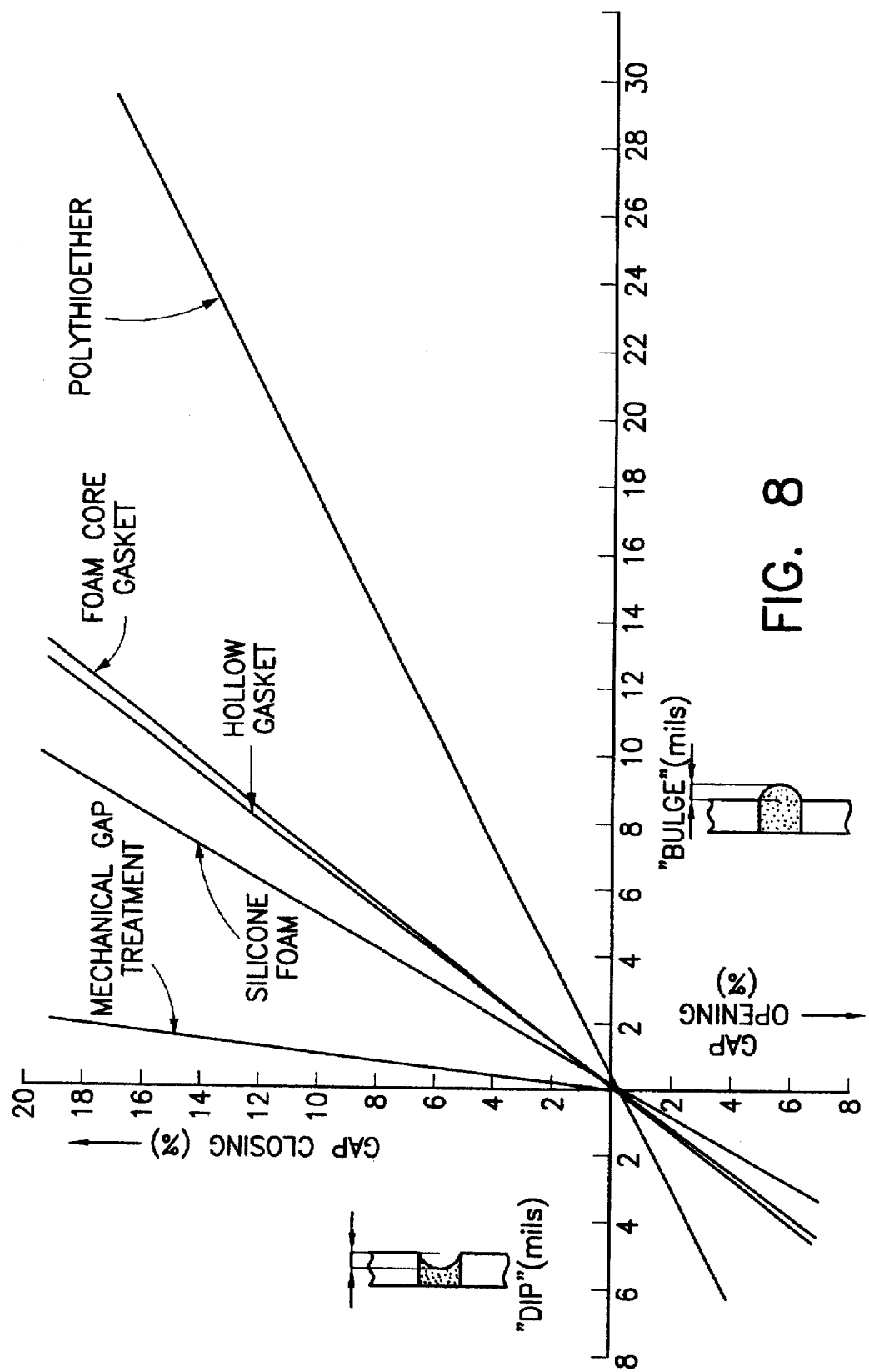

GAP FILLER DEVICE

BACKGROUND OF THE INVENTION

1. Field of the Invention

This invention relates to gap filler devices for sealing discontinuities in a variety of situations. In one instance, the gap filler device of the invention is suitable for use in the construction of advanced aircraft and, more particularly, relates to gap filler devices positioned in the slots formed between adjacent aircraft panels to cover such slots so that aircraft provided with such gap filler devices have improved laminar air flow thereover, fuel consumption, handling capabilities and electrical continuity, along with abated radar detection, sound and drag.

2. Description of the Prior Art

In aircraft construction, metallic plates are coupled or otherwise secured to a lower base structure as by Milson type fasteners, set screws or like mechanisms. The fasteners are preferably removable to allow for access to internal aircraft components and for the replacement and/or repair of the individual plates.

Proper engineering design of aircraft requires that adjacent plates be spaced a small distance from each other to allow for expansion and/or contraction of the plates during extreme thermal conditions. Such spacing also allows for plate shifting during the maneuvering of the aircraft when in operation and use. Unfortunately, however, the spacing between plates creates a discontinuous surface which interrupts the laminar airflow thereover resulting in undesirable sound, drag, poor fuel consumption and diminished handling capabilities. In addition, the plates are normally electrically conductive creating electrical discontinuities at the gaps which are detectable by radar. This is because the discontinuous electrical surfaces, as created by the spacing between plates, increases electrical interference when reflecting radar waves. This increases the detectability of the aircraft by radar. A discontinuous electrical flow also is ineffective for lightning discharge.

Various devices and techniques for covering gaps are either employed commercially or are disclosed in the patent literature. For example, a variety of known constructions for covering a seam or gap between adjoining members or surfaces are disclosed in U.S. Pat. Nos. 1,800,609 to Drake, 3,548,557 to Downing, Jr., and 3,593,475 to LaGue. In the field of aircraft, known constructions include U.S. Pat. Nos. 2,114,289 to Draim, 2,375,951 to Simon, and 5,014,934 to McClaflin. Most recent of these is the commonly assigned U.S. Pat. No. 5,065,960 to Castellucci. This patent discloses a gap filler device positionable in and across a gap formed between aircraft panels, the gap filler device including a horizontal portion extending across the gap and a vertical portion extending therefrom into the gap. In this instance, the vertical portion has edges in frictional contact with the side walls of the gap to resist removal of the gap filler device from the gap.

From a commercial standpoint, the most common technique for filling gaps has been to utilize a sealant, caulking agent or other filler material as of high temperature silicone, urethane or the like. The filler material is often loaded with an electromagnetic additive of a heavy metal such as nickel, silver, gold, ferrous metal or the like. Such filler material provides the desired electrical conductivity to abate electrical discontinuity. Unfortunately, such filler materials are expensive, heavy and bulky and cause galvanic corrosion. Further, the technique for using filler material is expensive since it is time consuming and requires the training of skilled personnel. Even then such technique can result in scratching of adjacent panels during the filling of gaps or the removal of filler material therefrom during maintenance and repair.

As evidenced by the great number of prior patents and commercial devices and techniques, efforts are continuously being made in an attempt to improve panel gap filler devices. Such efforts are being made to render such panel gap filler devices more efficient, reliable, inexpensive and convenient to manufacture, install and use. None of these previous efforts, however, provides the benefits attendant with the present invention. Additionally, the prior patents and commercial devices and techniques do not suggest the present inventive combination of component elements arranged and configured as disclosed and claimed herein.

It was in light of the prior art as generally related above that the present invention was conceived and has now been reduced to practice.

SUMMARY OF THE INVENTION

The invention is defined by the appended claims with the specific embodiments illustrated in the attached drawings. For the purpose of summarizing the invention, the invention may be incorporated into a gap filler device positionable in and across a gap formed between side walls of adjacent panels and comprises an elongated horizontal portion extending across the gap and a vertical portion extending into the gap. The vertical portion includes a pair of opposed, spaced apart, planar bearing surface members biased into frictional engagement with the side walls of the gap to resist removal of the gap filler device. The vertical portion has descending legs extending from opposed sides of the horizontal portion to a bight. Ascending legs extend from the bight to terminal ends. Slots are formed in the vertical portion and extend upwardly from the bight at spaced locations along the length of the legs. In one embodiment, a plurality of outwardly projecting spike members are formed on the bearing surface members for engagement with the side walls of the gap. In another embodiment, the adjacent panels define a gap with opposed overhangs and the terminal ends of the ascending legs are engageable with the overhangs when the vertical portion is inserted into the gap thereby preventing removal of the gap filler device from the gap. In another embodiment, the head member is of ceramic material and has a longitudinally extending slot therein and an elongated retainer member is engageably receivable in the longitudinal slot and the retainer member is fixed to the horizontal portion to thereby prevent its removal. In another embodiment relating to aircraft usage, the head member has opposed longitudinally extending edges contoured to minimize detection by radar.

As used herein, the terms "horizontal" and "vertical" and the like are recited in a relative sense and not in an absolute sense. That is, while there may be occasions in the course of this disclosure that these terms may denote actual orientation, this is not always true, but a "vertical" member is always transverse to a "horizontal" member.

The present invention achieves its intended purposes, objects, and advantages through a new, useful and nonobvious combination of component elements, with the use of a minimum number of functioning parts, at a reasonable cost to manufacture, and by employing only readily available materials.

Therefore, it is an object of this invention to provide an improved gap filler device positionable in and across a gap formed between aircraft panels, the gap filler device including a horizontal portion extending across the gap and a vertical portion extending therefrom into the gap, the vertical portion having a pair of opposed, spaced apart, bearing surface members biased into frictional engagement with the side walls of the gap to resist removal of said gap filler device from the gap.

Another object of the invention is to provide opposed, spaced apart, bearing surface members biased into frictional engagement with the side walls of the gap to resist removal of said gap filler device from the gap, the gap filler device being formed of an electrically conductive material selected to preclude galvanic corrosion when in contact with the panels.

A further object of the invention is to minimize galvanic corrosion between adjacent aircraft panels by the use of improved gap filler devices.

Still a further object of this invention is to simplify the design and usage of aircraft gap filler devices.

Yet a further object of the present invention is to improve the laminar flow of air adjacent to surfaces of the aircraft.

Yet a further object of this invention to abate undesirable sound and drag of an aircraft.

Still a further object of this invention is to improve fuel consumption and handling capabilities of an aircraft.

Still another object of the present invention is to preclude detection of aircraft by radar through the covering of gaps between adjacent aircraft panels.

The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF THE DRAWINGS

For a fuller understanding of the nature and objects of the present invention, reference should be had to the following detailed description taken in conjunction with the accompanying drawings in which:

FIG. 4 is a side elevation view of the gap filler device of the invention constructed in accordance with a preferred embodiment of the invention;

FIGS. 6a, 6b, and 6c are detail perspective views illustrating a variety of friction inducing configurations for improving the ability of a gap filler device according to the invention to remain positioned in a gap being filled;

FIG. 7 is a lateral cross section view through another embodiment of a gap filler device embodying the invention; and FIG. 8 is a graph illustrating the improved deformation performance of the gap filler device of the invention relative to known foam and caulk gap fillers, as a function of dimensional changes in gap width.

Similar reference characters refer to similar parts throughout the several figures.

DETAILED DESCRIPTION OF THE PREFERRED EMBODIMENTS

Figure 1:
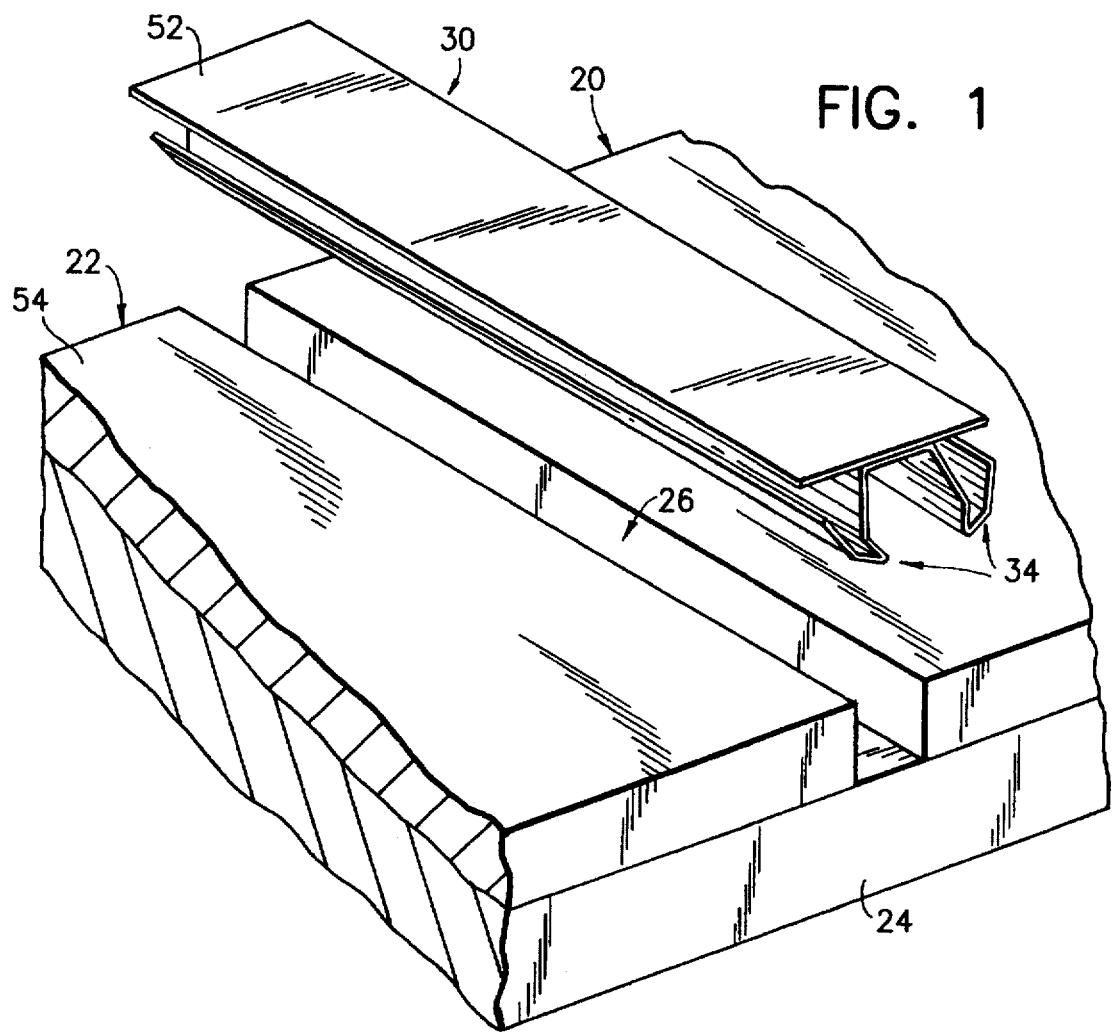
FIG. 1 is an exploded perspective illustration of adjacent panels forming the external skin of an aircraft removably coupled to a substructure with a gap in between the plates and with a gap filler device embodying the invention for filling the gap.

Turn now to the drawings and, initially, to FIG. 1 which illustrates adjacent panels 20, 22 forming the external skin of a portion of an aircraft. The panels are removably coupled to a substructure 24 with a gap 26 located between the panels 20, 22. The panels are generally metallic and coupled to the substructure 24 by suitable fasteners (not shown). The adjacent panels 20, 22 are spaced a small distance from each other to allow for expansion and/or contraction during extreme thermal conditions. Such spacing also accommodates plate shifting during the maneuvering of the aircraft.

The gaps 26, or spacing between panels, create a discontinuous surface. Without a gap filler device, the gaps would interrupt the laminar airflow thereover. This results in undesirable sound, drag, poor fuel consumption and diminished handling capabilities. All of these shortcomings are overcome by the use of the gap filler device 30 of the present invention. In addition, the panels 20, 22 are normally electrically conductive whereby electrical discontinuities would occur at the gaps if not properly filled rendering the aircraft more detectable by radar. The discontinuous electrical surfaces, as created by the spacing between panels, increases electrical interference for more readily reflecting radar waves. This increases the detectability of the aircraft by radar. The electrical discontinuity also precludes proper lightning discharge. The use of the gap filler devices of the present invention abates electrical discontinuities to thereby reduce detection by radar and increases lightning discharge.

Figure 2:
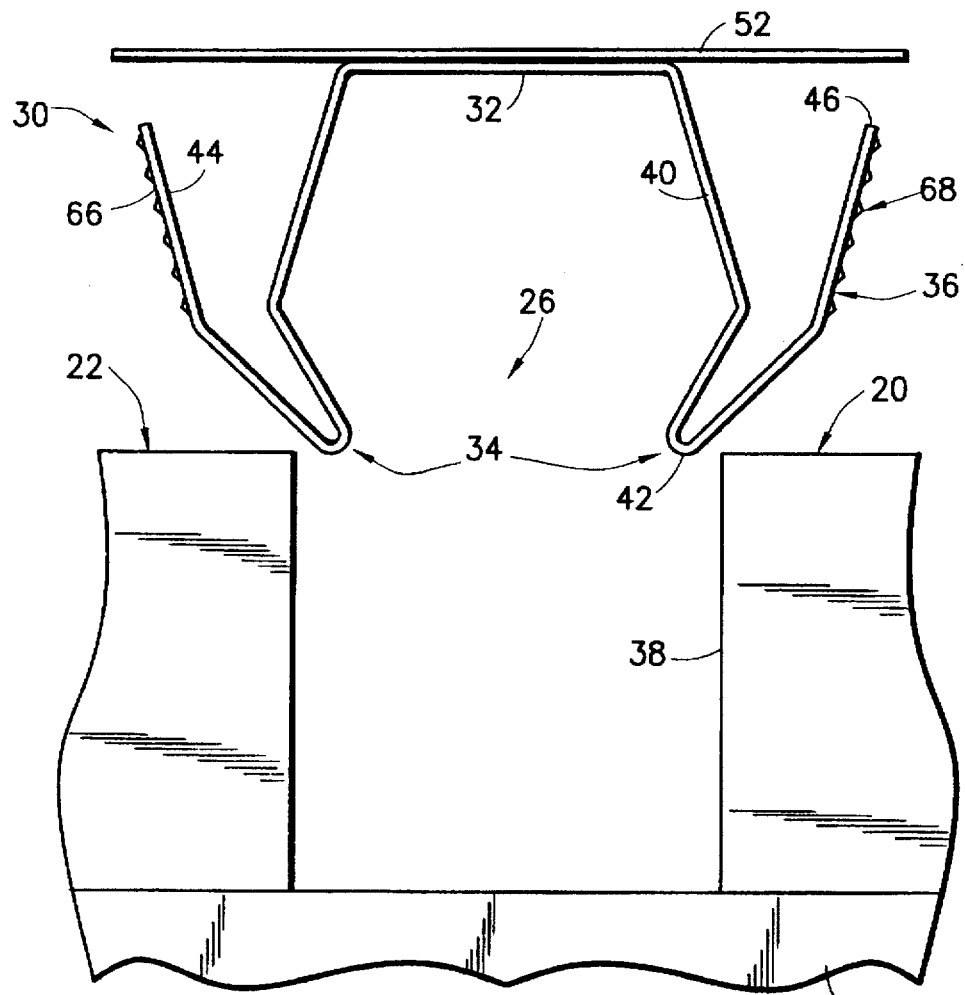
FIG. 2 is an enlarged end elevation view of the gap filler device illustrated in FIG. 1, about to be inserted into the gap.
Figure 3:
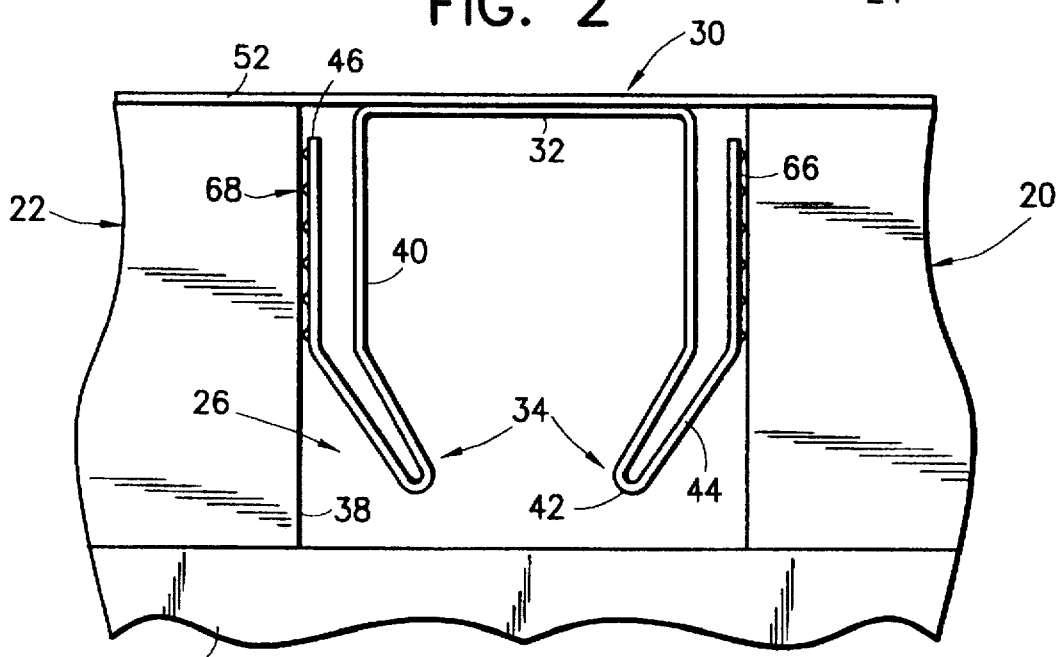
FIG. 3 is an enlarged end elevation view of the gap filler device illustrated in FIG. 1, inserted into the gap.

A primary embodiment of the invention is shown in FIGS. 2 and 3. In this embodiment, a gap filler device 30 is fabricated, preferably by extrusion, to include a centrally disposed horizontal portion 32 extending across the gap 26 and a vertical portion 34 extending downwardly therefrom into the gap 26. The vertical portion 34 includes a pair of opposed, spaced apart bearing surface members 36 biased into frictional engagement with the side walls 38 of the gap to resist removal of said gap filler device 30 from the gap.

The horizontal portion 32 and the vertical portion 34 are preferably formed of an electrically conductive material selected to preclude galvanic corrosion when in contact with the panels 20, 22 and to abate electrical discontinuities at the gaps between the panels thereby reducing aircraft detectability by radar and improving lighting strike tolerance.

The vertical portion 34 includes first and second descending legs 40 integrally formed with the centrally disposed horizontal portion 32 and extending downwardly from opposed sides of the horizontal portion, each of the descending legs extending to a bight 42. The vertical portion 34 also includes first and second ascending legs 44, integral, respectively, with the descending legs, the ascending legs extending to a terminal end 46 and the ascending legs are biased, respectively, away from their associated descending legs.

As seen in FIG. 4, slots 48 are formed in the vertical portion 34 extending upwardly from the bight 42 at spaced locations along the length of the legs 44, 46. The slots 48 extend upwardly from the bight 42 to a point just short of the horizontal portion 32. Preferably, these slots have an enlarged circular, or stress relief, aperture 50 at their uppermost ends to facilitate bending for accommodating expansion and contraction as occurs during extreme thermal conditions and/or during maneuvering of the aircraft during operation and use. Such bending may be in a direction tending to move the gap filler device 30 out of the gap 26 or it may be transverse with respect thereto towards or away from one of the side walls of the gap 26. Such slots 48 and circular apertures 50 facilitate the bending of the gap filler device for these purposes.

The configuration of the gap filler devices 30 of all embodiments of the present invention has added benefit over known techniques, such as loaded filler materials. Since the gap filler devices 30 are usually inserted and removed by unskilled technicians, a simple screw driver may by readily used for such purposes. Unlike most prior techniques, the task is simple and quick, snap in and snap out, which will not result in the inadvertent scratching of a panel surface.

As seen in FIGS. 1, 2, and 3, the construction of the gap filler device is completed with mention of a horizontal head member 52 which is fixed, as by welding, to the horizontal portion 32 and in contact with the adjacent panels 20, 22 at their exterior surfaces 54. To minimize galvanic corrosion, the head member 52 is preferably fabricated of the same material as the panels 20, 22. As seen in FIGS. 5a, 5b, 5c, and 5d, the head member may be of a variety of constructions. In each instance, the head member includes an elongated plate having opposed generally longitudinally extending edges contoured in the manner of saw teeth to minimize detection by radar.

Figure 5A:
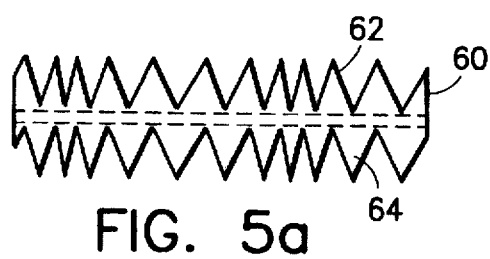
FIGS. 5a, 5b, 5c, and 5d are top plan views illustrating a variety of configurations of a component of the invention contoured to minimize detection by radar.
Figure 5B:
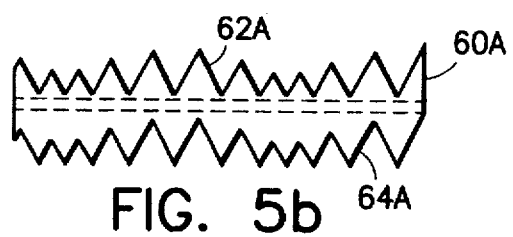
Figure 5C:
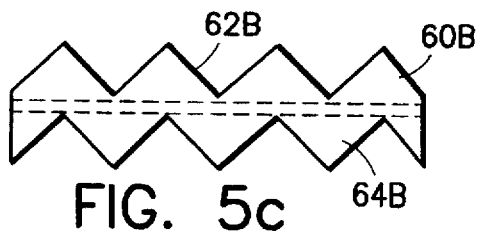
Figure 5D:
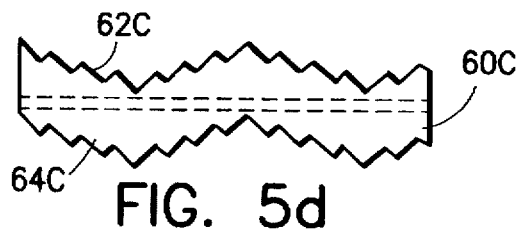

For example, in FIG. 5a, the head member includes an elongated plate 60 having opposed edges 62 of a saw tooth configuration with a series of tooth-like projections 64 being of varying wave length and same amplitude. In FIG. 5b, the head member includes an elongated plate 60A having opposed edges 62A of a saw tooth configuration with a series of tooth-like projections 64A being of the same wave length and different amplitude. In FIG. 5c, the head member includes an elongated plate 60B having opposed edges 62B of a saw tooth configuration with a series of tooth-like projections 64B being of the same wave length and same amplitude. In FIG. 5d, the head member includes an elongated plate 60C having opposed edges 62C of a saw tooth configuration with a series of tooth-like projections 64C being of varying wave length and varying amplitude.

To improve the ability of the gap filler device to grip the side walls 38 of the gap, each of the bearing surface members 36 is preferably formed to include a substantially planar surface 66 (FIGS. 2 and 3) from which a plurality of outwardly projecting spike members 68 are engageable with the side walls. The spike members form a continuous pattern across the planar surface 66 and may be of a variety of suitable configurations although it would be expected that only one configuration would be employed at a time on the surface 66. Typical of such configurations would be a teardrop shape indicated by reference numeral 68A (FIG. 6a), quadrilateral pyramid 68B (FIG. 6b), and triangular pyramid 68C (FIG. 6c). Each one of these configurations terminates at a point which serves to "dig in" to the side wall of the gap 26.

In another embodiment of the invention, viewing FIG. 7, adjacent panels 70, 72 partially defining a gap 74 include structure defining an opening 76 into the gap which is smaller than the width of the gap itself so as to define overhangs 78 over each side wall 80 of the gap. With this construction, the terminal ends 46 of the first and second ascending legs 44 of the gap filler device are engageable with the overhangs when the vertical portion 34 is inserted into the gap, thereby positively preventing removal of said gap filler device from the gap.

In another embodiment of the invention, but with continued reference to FIG. 7, a modified gap filler device 82 includes a head member 84 which is of ceramic material and has a longitudinally extending slot 86 therein and a reduced size lateral opening therein by reason of opposed lands 87. In this construction, an elongated retainer member 88 is engageably receivable in the longitudinal slot of the head member. The retainer member is slidably introduced, lengthwise, into the slot 86 of the head member 84 after which the retainer member is suitably fixed, as by welding, to the horizontal portion 32. In this manner, removal of the head member from the vertical portion is prevented.

In this instance, the head member 84 is formed of a suitable ceramic material and has tapering edge regions 90 to blend smoothly with adjacent panel surfaces 92 which are chamfered to receive the tapered edge regions. Also in this embodiment, as previously noted, it is preferable that the adjacent panels 70, 72 overhang, as at 78, the side walls 80 of the gap 74 so that the terminal ends 46 of the ascending legs 44 of the gap filler device 30 are positively secured in the gap. This embodiment is used most advantageously where the 70, 72 panels defining the gap 74 are heated to high temperatures, as for example in exhaust regions of aircraft or by high speed (e.g., hypersonic) flight.

In all of the embodiments discussed, the gap filler devices are fabricated of a material the same as that of the aircraft panels with which they are to be utilized. Galvanic corrosion is thus abated since the same materials have the same electrical conductivity and electromotive capabilities. If the aircraft panels are titanium, the gap filler devices are fabricated of titanium; if the aircraft panels are aluminum, the gap filler devices are fabricated of aluminum; if the aircraft panels are of a carbon composite material, the gap filler devices are fabricated of a carbon composite material; and so forth. Without like materials in contact with each other, galvanic corrosion would occur decreasing the effectiveness and life of the aircraft panels as well as the gap filler devices. Also, the shape of the gap filler devices in all of the above described embodiments provides a smooth surface, devoid of gaps, which functions to reduce undesirable noise, drag, increase fuel consumption, and improve handling capabilities. The electrical conductivity of the gap filler devices couples the panels on opposite sides of the gaps thus abating electrical discontinuities at the gaps between panels rendering the aircraft less detectable by radar and more capable of discharging lightning.

FIG. 8 is a graph showing the manner in which the invention provides superior deformation performance, relative to foam and caulk gap fillers, as a function of dimensional changes in gap width. Such changes occur, for example, as the adjacent panels are heated and cooled during flight or as the result of flight loading on the external surfaces of the aircraft.

It is noteworthy to explain that the present invention differs from the gap filler of U.S. Pat. No. 5,065,960 in the construction of the vertical portion 34 and also in the preferred embodiment of FIG. 7 according to which the retainer member 88 may be inserted into and removed from the ceramic head member 84. The design of the bearing surface members 36 provides increased surface contact with the side walls of the gap, increasing the frictional forces retaining the gap filler in the gap. The design of the vertical portion 34 also allows the gap filler device 30 to flex and deform as the adjacent panels expand, contract, and flex during flight, while maintaining the head member in contact with the panel surfaces with minimal surface discontinuity across the gap.

The present disclosure includes that contained in the appended claims as well as that of the foregoing description. Although this invention has been described in its preferred forms With a certain degree of particularity, it is understood that the present disclosure of the preferred form has been made only by way of example and numerous changes in the details of construction and combination and arrangement of parts may be resorted to without departing from the spirit and scope of the invention.

What is claimed is:

1. A gap filler device comprising:
   an elongated centrally disposed horizontal portion for extending across a gap formed between side walls of adjacent panels; and
   a vertical portion extending therefrom for insertion into the gap, said vertical portion including first and second descending legs integrally formed with said hoxizontal portion and extending downwardly from opposed sides thereof, each of said descending legs extending to a bight and first and second ascending legs, integral, respectively, with said first and second descending legs, said first and second ascending legs extending from said bight to opposed, spaced apart bearing surface members and then to a terminal end, said opposed, spaced apart bearing surface members being biased, respectively, away from said first and second descending legs an into frictional engagement with the side walls of the gap upon insertion of said vertical portion into the gap to resist removal of said gap filler device from the gap.

2. A gap filler device as set forth in claim 1
   wherein said horizontal portion and said vertical portion are formed of an electrically conductive material for precluding galvanic corrosion when in contact with the panels and for abating electrical discontinuities at the gaps between the panels, thereby reducing aircraft detectability by radar and improving lighting strike tolerance.

3. A gap filler device as set forth in claim 1 including:
   slots in said vertical portion extending upwardly from said bight at spaced locations along the length of said legs.

4. A gap filler device as set forth in claim 3 and further including:
   said vertical portion having a stress relief aperture at the top of each slot.

5. A gap filler device as set forth in claim 1 including:
   a horizontal head member fixed to said horizontal portion for contacting the adjacent panels at their exterior surfaces.

6. A gap filler device as set forth in claim 5
   wherein said head member is of ceramic material and has a longitudinally extending slot therein; and
   including:
   an elongated retainer member engageably receivable in the longitudinal slot of said head member, said retainer member being fixed to said horizontal portion to thereby prevent removal of said head member from said vertical portion.

7. A gap filler device as set forth in claim 6
   wherein said retainer member is metallic and is welded to said horizontal portion.

8. A gap filler device as set forth in claim 5 wherein:
   wherein said head member is fabricated of the same material as the panels.

9. A gap filler device as set forth in claim 1
   wherein each of said bearing surface members includes a substantially planar surface on each of said first and second ascending legs and a plurality of outwardly projecting spike members on said planar surface for engaging the side walls of the gap.

10. In combination with an aircraft having an exterior surface formed of adjacent panels having gaps between side walls of said adjacent panels, a gap filler device comprising:
    an elongated centrally disposed horizontal portion extending across the gap; and
    a vertical portion extending downwardly therefore into the gap, said vertical portion including first and second descending legs integrally formed with said horizontal portion and extending downwardly from opposed sides thereof, each of said descending legs extending to a bight and first and second ascending legs, integral, respectively, with said first and second descending legs, said first and second ascending legs extending from said bight to a terminal end and biased, respectively, away from said first and second descending legs, each of said first and second ascending legs including opposed, spaced apart bearing surface members biased into frictional engagement with the side walls of the gap to resist removal of said gap filler device from the gap.

11. A combination as set forth in claim 10
    wherein said horizontal portion and said vertical portion are formed of an electrically conductive material selected to preclude galvanic corrosion when in contact with the panels and to abate electrical discontinuities at the gaps between the panels thereby reducing aircraft detectability by radar and improving lightning strike tolerance.

12. A combination as set forth in claim 10 including:
    slots in said vertical portion extending upwardly from said bight at spaced locations along the length of said legs.

13. A combination as set forth in claim 12 and further including:
    said vertical portion having a stress relief aperture at the top of each slot.

14. A combination as set forth in claim 10 including:
    a head member fixed to said horizontal portion and being in contact with adjacent panels at their exterior surfaces.

15. A combination as set forth in claim 14
    wherein said head member includes an elongated plate having opposed generally longitudinally extending edges contoured to minimize detection by radar.

16. A combination as set forth in claim 15 wherein said opposed edges are of a saw tooth configuration having a series of tooth-like projections having one of the following designs: (a) varying wave length and same amplitude; (b) same wave length and different amplitude; (c) same wave length and same amplitude; and (d) varying wave length and varying amplitude.

17. A combination as set forth in claim 14 wherein said head member is of ceramic material and has a longitudinally extending slot therein; and including:

an elongated retainer member engageably receivable in the longitudinal slot of said head member, said retainer member being fixed to said horizontal portion to thereby prevent removal of said head member from said vertical portion.

18. A combination as set forth in claim 17 wherein said retainer member is metallic and is welded to said horizontal portion.

19. A combination as set forth in claim 14 wherein said head member is fabricated of the same material as said panels.

20. A combination as set forth in claim 10 wherein said adjacent panels defining the gap include structure defining an opening into the gap which is smaller than the width of the gap so as to define overhangs over each side wall of the gap; and wherein said terminal ends of said first and second ascending legs are engageable with said overhangs when said vertical portion is inserted into the gap, thereby preventing removal of said gap filler device from the gap.

21. A combination as set forth in claim 10 wherein each of said bearing surface members includes a substantially planar surface and a plurality of outwardly projecting spike members on said planar surface engageable with the side walls of the gap.

* * * * *